US010985378B2

(12) United States Patent
Chen et al.

(10) Patent No.: US 10,985,378 B2
(45) Date of Patent: Apr. 20, 2021

(54) ELECTROLYZED COPPER FOIL AND CURRENT COLLECTOR OF ENERGY STORAGE DEVICE

(71) Applicant: Industrial Technology Research Institute, Hsinchu (TW)

(72) Inventors: Jhen-Rong Chen, Taoyuan (TW); Chiu-Yen Chiu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 70 days.

(21) Appl. No.: 16/578,413

(22) Filed: Sep. 23, 2019

(65) Prior Publication Data

US 2020/0083539 A1    Mar. 12, 2020

Related U.S. Application Data

(63) Continuation-in-part of application No. 16/232,071, filed on Dec. 26, 2018, now abandoned.

(30) Foreign Application Priority Data

Sep. 12, 2018 (TW) .................. 107132133
Jul. 19, 2019 (TW) .................. 108125545

(51) Int. Cl.
*B32B 15/01* (2006.01)
*H01M 4/66* (2006.01)
(Continued)

(52) U.S. Cl.
CPC .............. *H01M 4/667* (2013.01); *C25D 1/04* (2013.01); *C25D 3/38* (2013.01); *H01M 4/661* (2013.01);
(Continued)

(58) Field of Classification Search
None
See application file for complete search history.

(56) References Cited

U.S. PATENT DOCUMENTS

2008/0099110 A1*  5/2008  Muroga .................... C22C 9/02
                                                              148/684
2009/0061326 A1*  3/2009  Hirose ................ H01M 2/0257
                                                              429/338
(Continued)

FOREIGN PATENT DOCUMENTS

CN        103730445        4/2014
CN        104419983        3/2015
(Continued)

OTHER PUBLICATIONS

"Office Action of Taiwan Counterpart Application," dated Jan. 15, 2020, p. 1-p. 4.
(Continued)

*Primary Examiner* — Seth Dumbris
(74) *Attorney, Agent, or Firm* — JCIPRNET

(57) ABSTRACT

An electrolyzed copper foil and a current collector of an energy storage device are provided. The electrolyzed copper foil includes a transition layer and a nano-twin copper layer formed on the transition layer. The transition layer has an equiaxial grain of a (111) plane having a volume ratio of 20-40%, a (200) plane having a volume ratio of 20-40%, and a (220) plane having a volume ratio of 20-40%. A thickness of the transition layer is 0.2 μm to 1.5 μm. The nano-twin copper layer has a columnar grain of the (111) plane having a volume ratio of more than 85%, and a thickness of the nano-twin copper layer is 3 μm to 30 μm.

10 Claims, 3 Drawing Sheets

(51) Int. Cl.
    *H01M 10/0525*    (2010.01)
    *C25D 3/38*    (2006.01)
    *C25D 1/04*    (2006.01)
    *H01M 4/02*    (2006.01)

(52) U.S. Cl.
    CPC .. *H01M 10/0525* (2013.01); *H01M 2004/021* (2013.01); *H01M 2220/20* (2013.01); *Y10T 428/12431* (2015.01)

(56) References Cited

U.S. PATENT DOCUMENTS

| | | | |
|---|---|---|---|
| 2012/0015206 A1* | 1/2012 | Kim | B32B 15/01 |
| | | | 428/606 |
| 2013/0122326 A1* | 5/2013 | Chen | C30B 29/605 |
| | | | 428/641 |
| 2014/0103501 A1* | 4/2014 | Chen | H01L 23/53238 |
| | | | 257/666 |

FOREIGN PATENT DOCUMENTS

| | | |
|---|---|---|
| CN | 106191939 | 12/2016 |
| CN | 111172567 | 5/2020 |
| TW | 201321557 | 6/2013 |
| TW | 201404942 | 2/2014 |
| TW | I542739 | 7/2016 |

OTHER PUBLICATIONS

"Office Action of China Counterpart Application", dated Jul. 23, 2020, p. 1-p. 6.

* cited by examiner

ELECTROLYZED COPPER FOIL AND CURRENT COLLECTOR OF ENERGY STORAGE DEVICE

CROSS-REFERENCE TO RELATED APPLICATION

This application is a continuation-in-part of and claims the priority benefit of U.S. application Ser. No. 16/232,071, filed on Dec. 26, 2018, now pending, which claims the priority benefit of Taiwan application Ser. No. 107132133, filed on Sep. 12, 2018. This application also claims the priority benefit of Taiwan application Ser. No. 108125545, filed on Jul. 19, 2019. The entirety of each of the above-mentioned patent applications is hereby incorporated by reference herein and made a part of this specification.

TECHNICAL FIELD

The disclosure relates to an electrolyzed copper foil.

BACKGROUND

The major automakers are optimistic about the prospects of the electric vehicle market, and have accelerated the development of new electric vehicles. As a result, the demand for electric vehicle lithium batteries has increased significantly.

The copper foil for the negative electrode current collector in the new electric vehicle lithium battery needs to have high conductivity, and at the same time needs to withstand high process temperatures and the volume expansion and contraction caused by lithium ion intercalation and de-intercalation during charging and discharging. However, conventional copper foils are all softened at this temperature, and the high strength requirements of the lithium battery foil is not readily met.

Therefore, the development of a copper foil for an electric vehicle lithium battery that may withstand high temperatures and is not susceptible to softening and cracking and has better conductivity is needed.

SUMMARY

The electrolyzed copper foil of the disclosure includes a transition layer and a nano-twin copper layer formed on the transition layer. The transition layer has an equiaxial grain of a (111) plane having a volume ratio of 20-40%, a (200) plane having a volume ratio of 20-40%, and a (220) plane having a volume ratio of 20-40%, and a thickness of the transition layer is 0.2 μm to 1.5 μm. The nano-twin copper layer has a columnar grain of the (111) plane having a volume ratio of more than 85%, and a thickness of the nano-twin copper layer is 3 μm to 30 μm.

The current collector of the energy storage device of the disclosure includes the above electrolyzed copper foil.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

The disclosure provides an electrolyzed copper foil that has both high strength and high conductivity and may resist high-temperature softening.

The disclosure further provides a current collector of an energy storage device that has high conductivity and is resistant to high-temperature softening.

An embodiment of the disclosure provides an electrolyzed copper foil having a structure that includes a transition layer and a nano-twin copper layer formed on the transition layer. The transition layer has an equiaxial grain of a (111) plane having a volume ratio of 20-40%, a (200) plane having a volume ratio of 20-40%, and a (220) plane having a volume ratio of 20-40%, and a thickness of the transition layer is 0.2 μm to 1.5 μm. The nano-twin copper layer has a columnar grain of the (111) plane having a volume ratio of more than 85%, and a thickness of the nano-twin copper layer is 3 μm to 30 μm.

Another embodiment of the disclosure provides an electrolyzed copper foil having a structure that includes a transition layer and a nano-twin copper layer formed on the transition layer. The transition layer is equiaxial grains of a (111) plane having a volume ratio of 20-40%, a (200) plane having a volume ratio of 20-40%, and a (220) plane having a volume ratio of 20-40%, and a thickness of the transition layer is 0.2 μm to 1.5 μm. The nano-twin copper layer is columnar grains of the (111) plane having a volume ratio of more than 85%, and a thickness of the nano-twin copper layer is 3 μm to 30 μm.

Figure 1:
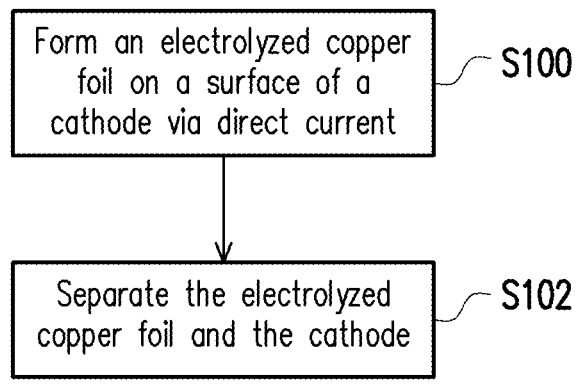
FIG. 1 is a step diagram of a manufacturing process of an electrolyzed copper foil according to an embodiment of the disclosure.

FIG. 1 is a step diagram of a manufacturing process of an electrolyzed copper foil according to an embodiment of the disclosure.

Referring to FIG. 1, the method of the present embodiment includes first performing step S100 to form an electrolyzed copper foil on the surface of a cathode by direct current, and the conditions thereof include performing at a range of 35° C. to 55° C. using a copper sulfate electrolyte containing 40 g/L to 120 g/L of copper ions, 40 g/L to 110 g/L of sulfuric acid, and 20 ppm to 90 ppm of chloride ions at a current density between 20 ASD and 60 ASD. The yield is about 8.8 μm/minute or more. In some embodiments, the electrolyte temperature may be between 40° C. and 50° C., or the current density may be between 30 ASD and 60 ASD. If the electrolyte temperature is too low or the current density is too small, the yield is too slow to meet the requirements of mass production of the copper foil factory. In an embodiment, the cathode includes a titanium metal, titanium alloy, or a stainless steel. In another embodiment, the cathode may also include a conductive substrate and a release layer formed on the surface of the conductive substrate, wherein the material of the separation layer may be a metal oxide such as titanium oxide, nickel oxide, or chromium oxide; and the conductive substrate may be made of any electrically conductive material such as acid-resistant titanium or stainless steel. The electrolyzed copper foil formed by the method above has a structure that includes a transition layer and a nano-twin copper layer formed on the transition layer. The transition layer includes an equiaxial grain of a (111) plane, a (200) plane, and a (220) plane, and the nano-twin copper layer is mainly columnar grain of the (111) plane, and in the transition layer, the volume ratio of the equiaxial grain of the (111) plane is 20% to 40%, the volume ratio of the equiaxial grain of the (200) plane is 20% to 40%, and the volume ratio of the equiaxial grain of the (220) plane is 20% to 40%; and the volume ratio of the columnar grain of the (111) plane in the nano-twin copper layer may reach 85% or more. In some embodiments, the columnar grain of the (111) plane in the structure of the electrolyzed copper foil formed by the above method accounts for at least 70% of the cross-sectional area of the electrolyzed copper foil.

The concentration of the various components included in the electrolyte may be adjusted according to the required thickness and process yield. For example, the copper concentration in the electrolyte is in the range of about 40 g/L to 120 g/L, such as 60 g/L to 100 g/L; the concentration of sulfuric acid in the electrolyte is in the range of about 40 g/L to 110 g/L, such as 80 g/L to 100 g/L; and the concentration of chlorine in the electrolyte is in the range of about 30 ppm to 90 ppm, such as 30 ppm to 50 ppm. The electrolyte may also include iron ions or zinc ions. Moreover, additives such as a brightener, a crystal plane modifier, and the like may also be optionally added in the electrolyte as needed. The concentration of the brightener may be below about 5 mL/L, such as in the range of 2 mL/L to 5 mL/L; and the concentration of the crystal plane modifier may be in the range of about 5 mL/L to 40 mL/L, such as in the range of 10 mL/L to 40 mL/L. The components of the brightener may include, for example, a nitrogen-containing functional group compound, a sulfur-containing functional group compound, or a combination thereof. The components of the crystal plane modifier may include, for example, gelatin, chloride ions, or a combination thereof.

In addition, before step S100 is performed, the cathode may be immersed in the electrolyte for a predetermined time (such as 20 seconds to 50 seconds). In the immersion step, the additives may be pre-adsorbed on the surface of the cathode, thus providing better reproducibility to the microstructure of the electrolyzed copper foil to improve the stability of the electrolyzed copper foil quality.

Then, in step S102, the cathode and the electrolyzed copper foil are separated. The manner of separation is mainly physical, such as stripping.

The electrolyzed copper foil provided in the present embodiment may be suitable for an energy storage device application, such as a copper foil substrate in a negative electrode current collector of a lithium battery. The columnar grain included in the structure of the electrolyzed copper foil is formed by stacking a plurality of plate-shaped structures perpendicular to the grain boundaries of the columnar grain. In an embodiment, the length ratio of a major axis to a minor axis of the plate-shaped structures is about 2 to 40.

The electrolyzed copper foil manufactured according to the present embodiment may have features such as a surface roughness Rz (JIS) less than 2 µm and a conductivity higher than 90% IACS. The thickness of the electrolyzed copper foil may be adjusted according to product requirements, wherein the thickness of the transition layer may be 0.2 µm to 1.5 µm, and the thickness of the nano-twin copper layer may be 3 µm to 30 µm, for example, 3 µm to 12 µm. In the case of the electrolyzed copper foil used as the current collector of a battery, in an embodiment, the prepared electrolyzed copper foil has features such as a surface roughness Rz (JIS) less than 2 µm, a thickness of 6 µm to 8 µm, and a conductivity higher than 90% IACS. In another embodiment, the resulting electrolyzed copper foil may have a thickness less than 31.5 µm. In another embodiment, the resulting electrolyzed copper foil may have a thickness less than 13.5 µm.

It is experimentally proven that the tensile strength at room temperature of the electrolyzed copper foil produced in the present embodiment is greater than 50 kg/mm$^2$; the tensile strength of the electrolyzed copper foil at 0.5% elongation is greater than 32 kg/mm$^2$; the yield strength of the electrolyzed copper foil at 0.5% elongation is greater than 40 kg/mm$^2$; the tensile strength reduction of the electrolyzed copper foil after heat treatment at 350° C. for one hour is no more than 20%; after the electrolyzed copper foil is heat-treated at 350° C. for one hour, a change amount in a volume ratio of the (111) plane in the nano-twin copper layer is less than 5%, and the tensile strength thereof is greater than or equal to 40 kgf/mm$^2$. Those mechanical properties meet the mechanical characteristic requirements of the current collector of the electric vehicle lithium battery.

Based on the above, the disclosure produces a high-temperature electrolyzed copper foil without being softened and cracked while having high conductivity. The electrolyzed copper foil produced by the disclosure may be applied to a current collector as an energy storage device due to the feature of resistance to high-temperature softening thereof.

A number of experimental examples are described below to verify the efficacy of the disclosure. However, the disclosure is not limited to the following content. The raw materials, amounts and ratios, and treatment details of the electrolyte used, etc. may be suitably changed without exceeding the scope of the disclosure. Accordingly, restrictive interpretation should not be made to the disclosure based on the experiments described below.

Experimental Example 1

First, a basic electrolyte (sulfuric acid-sulfuric acid copper electrolyte) was prepared, containing copper ions: 90 g/L, sulfuric acid: 45 g/L, and 30 ppm of chloride ions, and 10 mL/L of a crystal plane modifier and 5 mL/L of a brightener were added as additives, wherein the crystal plane modifier was a commercially-available crystal plane modifier (manufacturer: CLC, product number ECD731), and the brightener was also a commercially-available brightener (manufacturer: CLC, product number GR891).

A (polished) titanium drum of a rotating electrode device was used as the cathode, the anode was an insoluble anode (DSA), and using a DC power supply, the cathode was first immersed in an electrolyte for 40 seconds, and then an electrolyzed copper foil having a thickness of 8 µm was directly formed on the surface of the titanium drum at a current density 40 ASD, an electrolyte temperature of 40° C., and an electrode rotation speed of 700 rpm.

After the electrolysis was completed, the electrolyzed copper foil was separated from the titanium drum and subjected to subsequent tests. The test results are shown in Table 1 below.

Experimental Example 2

A basic electrolyte (sulfuric acid-sulfuric acid copper electrolyte) was prepared, containing copper ions: 90 g/L, sulfuric acid: 45 g/L, and 30 ppm of chloride ions, and 40 mL/L of the above crystal plane modifier and 2 mL/L of the above brightener were added as additives.

The same electrolytic device as experimental example 1 was used, and the cathode was first immersed in the electrolyte for 40 seconds, and then an electrolyzed copper foil having a thickness of 8 μm was directly formed on the surface of the titanium drum at a current density 40 ASD, an electrolyte temperature of 40° C., and an electrode rotation speed of 700 rpm.

After the electrolysis was completed, the electrolyzed copper foil was separated from the titanium drum and subjected to subsequent tests. The test results are shown in Table 1 below.

Experimental Example 3

A basic electrolyte (sulfuric acid-sulfuric acid copper electrolyte) was prepared, containing copper ions: 90 g/L, sulfuric acid: 45 g/L, and 30 ppm of chloride ions, and 40 mL/L of the above crystal plane modifier and 5 mL/L of the above brightener were added as additives.

The same electrolytic device as experimental example 1 was used, and the cathode was first immersed in the electrolyte for 40 seconds, and then an electrolyzed copper foil having a thickness of 8 μm was directly formed on the surface of the titanium drum at a current density 40 ASD, an electrolyte temperature of 40° C., and an electrode rotation speed of 700 rpm.

After the electrolysis was completed, the electrolyzed copper foil was separated from the titanium drum and subjected to subsequent tests. The test results are shown in Table 1 below.

Experimental Example 4

The same electrolysis process as experimental example 2 was used, and the only difference is that the cathode was placed in the electrolyte and then directly electrolyzed without immersion, followed by subsequent testing. The test results are shown in Table 1 below.

Experimental Example 5

The same electrolysis process as in Experimental example 1 was used, but the amount of sulfuric acid in the base electrolyte was changed to 90 g/L, the amount of the crystal plane modifier was changed to 40 mL/L, and no brightener was added.

After the electrolysis was completed, the electrolyzed copper foil was separated from the titanium drum and subjected to subsequent tests. The test results are shown in Table 2 below.

Experimental Example 6

The same electrolysis process as in Experimental example 5 was used, but 2 mL/L of a brightener was additionally added to the base electrolyte.

After the electrolysis was completed, the electrolyzed copper foil was separated from the titanium drum and subjected to subsequent tests. The test results are shown in Table 2 below.

Experimental Example 7

The same electrolysis process as in Experimental example 5 was used, but 5 mL/L of a brightener was additionally added to the base electrolyte.

After the electrolysis was completed, the electrolyzed copper foil was separated from the titanium drum and subjected to subsequent tests. The test results are shown in Table 2 below.

Comparative Example

Subsequent testing was performed using a double-sided brightened copper foil having a thickness of 8 μm sold by Fukuda Metal Foil & Powder Co., Ltd. as a control. The test results are shown in Table 1 and Table 2 below.

[Analysis Method]

<Roughness>

The roughness (RZ) was measured by a contact roughness meter in accordance with JIS94 specifications.

<Conductivity>

The conductivity (% IACS) was obtained by measuring the sheet resistance thereof using a four-point probe and substituting the result into the copper foil thickness calculation (copper foil thickness was converted based on the weight in grams per meter square-$g/m^2$).

<Hardness>

The hardness test was measured on a Vickers hardness tester with a test load of 10 grams.

<Tensile Strength and Elongation>

The measurement of room temperature tensile strength (RTS) and room temperature elongation (REL) were as follows. The copper foils were kept for 24 hours or more after electroplating and then stamped into a dumbbell shape (gauge length: 50 mm, gauge width: 3 mm) for testing. Moreover, the electrolyzed copper foils after electrolysis were heat-treated at 350° C. for one hour in a protective atmosphere, and then taken out after cooling, and were also stamped into a dumbbell-shaped test piece for testing to obtain the tensile strength (HTS) and elongation (HEL) after the high-temperature treatment.

Figure 2:
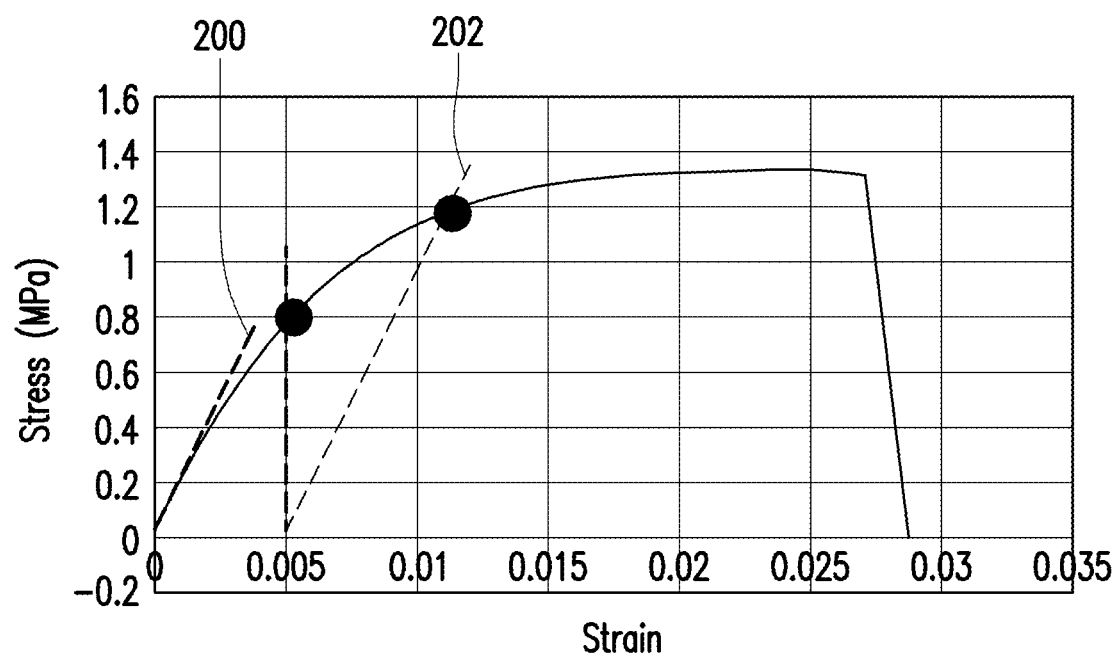
FIG. 2 is an exemplary stress-strain curve.

In addition, the values of tensile strength and yield stress of 0.5% elongation may also be obtained from the RTS test. For example, FIG. 2 shows an exemplary stress-strain curve, wherein the X-axis is the strain value, so the strain value 0.005 refers to 0.5% elongation, and the tensile strength of 0.5% elongation refers to the curve stress value when the strain value is 0.005; the point at which the line 202 parallel to the line segment 200 intersects the stress-strain curve from the 0.005 curve position on the strain axis is the plastic deformation stress value of 0.5% elongation (yield strength of 0.5% elongation), and the line segment 200 is a tangent line of the stress-strain curve at zero strain.

<Elastic Modulus>

The normal elastic modulus ($E_R$) and the high-temperature elastic modulus (EH) were calculated from the data curves obtained from the tensile test.

TABLE 1

|  |  | Rz (μM) | IACS (%) | Hardness ($H_v$) | RTS (kgf/mm²) | HTS | REL (%) | HEL | $E_R$ (GPa) | $E_H$ |
| --- | --- | --- | --- | --- | --- | --- | --- | --- | --- | --- |
| Experimental example | 1 | 1.4 to 1.6 | 97.6 | 152.9 | 60.5 | 50.0 | 2.8 | 2.5 | 75.3 | 79.9 |
|  | 2 | 1.7 to 1.8 | 97.9 | 166.2 | 63.6 | 53.6 | 3.0 | 3.0 | 90.4 | 94.5 |

TABLE 1-continued

|  | | Rz (μM) | IACS (%) | Hardness ($H_v$) | RTS (kgf/mm²) | HTS (kgf/mm²) | REL (%) | HEL (%) | $E_R$ (GPa) | $E_H$ (GPa) |
|---|---|---|---|---|---|---|---|---|---|---|
| | 3 | 1.87 | 96.4 | 205.7 | 63.4 | 49.8 | 3.0 | 2.7 | 95.6 | 86.4 |
| | 4 | 1.7 to 1.8 | — | — | 47.6 | 45.8 | 2.5 | 3.8 | — | — |
| Comparative example | | 1.0 | 96.5 | 33.6 | 35.3 | 26.0 | 3.0 | 5.8 | 67.6 | 43.3 |

It can be concluded from Table 1 that Experimental examples 1 to 3 may achieve the expected effect, a self-annealing phenomenon at room temperature did not occur to the tensile strengths thereof, the room temperature tensile strengths may be kept high at 60 kg/mm² to 63 kg/mm², and the conductivities thereof were good at 96% IACS or more; after annealing at 350° C. for one hour, the tensile strengths thereof were still at a level of 50 kgf/mm². The 8 μm double-sided brightened copper foil Fukuda product as a comparative example had a tensile strength of only 35.3 kgf/mm² at room temperature and an elongation of only 3%; after annealing at 350° C. for one hour, the tensile strength was reduced to 26 kgf/mm², and the elongation was increased to 5.8%. It shows that the high-temperature microstructure of the comparative example was softened due to grain growth from heat, and therefore the strength was reduced and the elongation was increased.

TABLE 2

|  | | Rz (μm) | IACS (%) | Hardness ($H_v$) | RTS (kgf/mm²) | HTS (kgf/mm²) | REL (%) | HEL (%) | $E_R$ (GPa) | $E_H$ (GPa) | RTS1 (kgf/mm²) | RTS2 (kgf/mm²) |
|---|---|---|---|---|---|---|---|---|---|---|---|---|
| Experimental example | 5 | 1.2 to 1.6 | 97.2 | 128 | 64.4 | 54.6 | 3.2 | 3.5 | 85.5 | 69.3 | 32.9 | 57.8 |
| | 6 | 1.2 to 1.5 | 98.1 | 134 | 65.2 | 56.1 | 3.0 | 2.4 | 74.3 | 72.8 | 35.4 | 59.0 |
| | 7 | 1.2 to 1.6 | 90.0 | 141 | 69.7 | 55.9 | 3.1 | 4.5 | 88.6 | 73.1 | 36.0 | 58.9 |
| Comparative example | | 1.0 | 96.5 | 33.6 | 35.3 | 26.0 | 3.0 | 5.8 | 67.6 | 43.3 | 27.8 | 33.9 |

RTS1: tensile strength of 0.5% elongation.
RTS2: yield strength of 0.5% elongation.

It can be concluded from Table 2 that Experimental examples 5 to 7 may achieve the expected effect, a self-annealing phenomenon at room temperature did not occur to the tensile strengths thereof, the room temperature tensile strengths may be kept high at 64 kg/mm² to 70 kg/mm², the conductivities thereof were good at 90% IACS or more, the tensile strength at 0.5% elongation was greater than 32 kg/mm², and the yield strength at 0.5% elongation was greater than 57 kg/mm²; after annealing at 350° C. for one hour, the tensile strengths thereof were still at a level of 54 kgf/mm². The 8 μm double-sided brightened copper foil Fukuda product as a comparative example had a tensile strength of only 35.3 kgf/mm² at room temperature and an elongation of only 3%, the tensile strength at 0.5% elongation was only 27.8 kg/mm², and the yield strength at 0.5% elongation was only 33.9 kg/mm²; after annealing at 350° C. for one hour, the tensile strength was reduced to 26 kgf/mm², and the elongation was increased to 5.8%. It shows that the high-temperature microstructure of the comparative example was softened due to grain growth from heat, and therefore the strength was reduced and the elongation was increased.

Figure 3A:
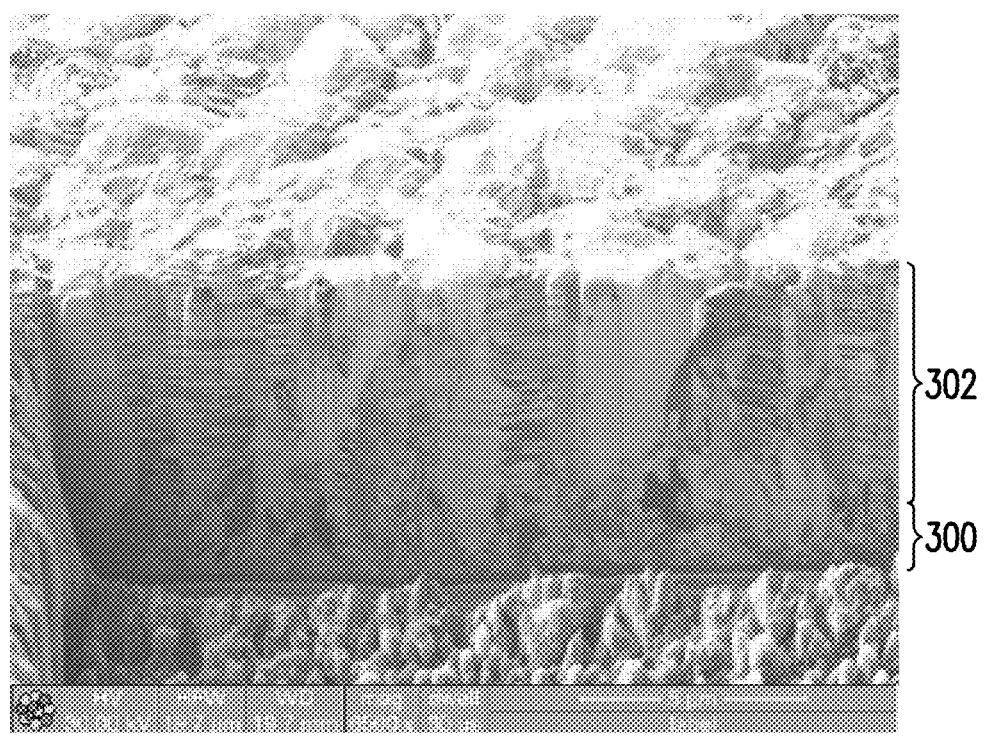
FIG. 3A is a focused ion beam (FIB) micrograph of the electrolyzed copper foil slice of experimental example 3.
Figure 3B:
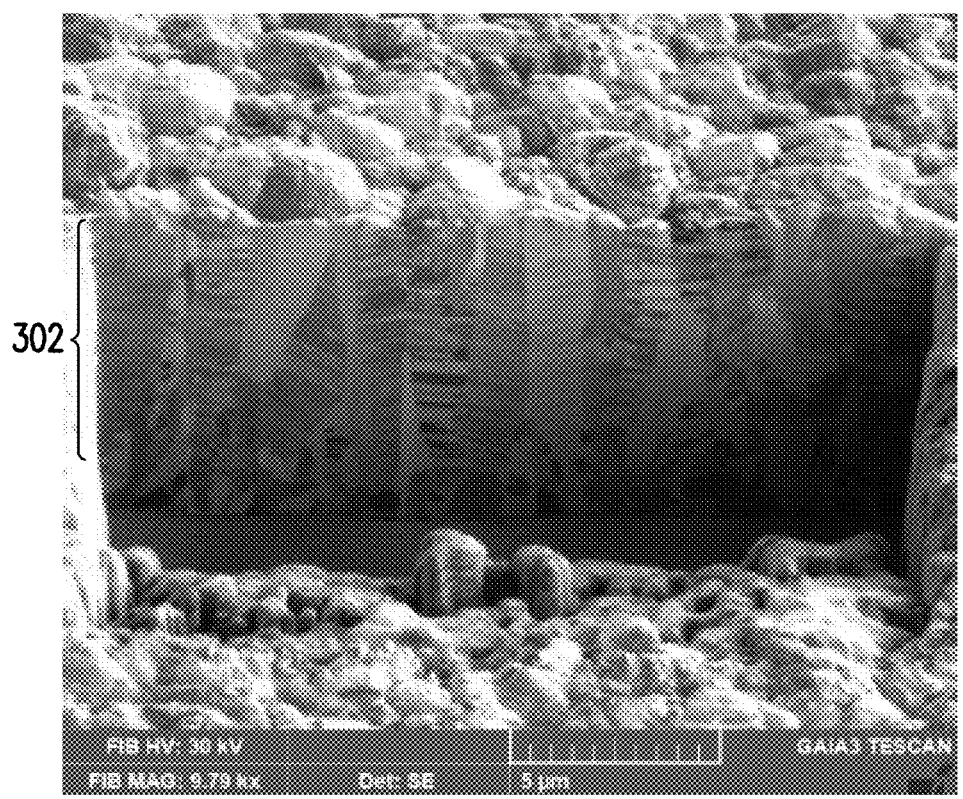
FIG. 3B is a FIB micrograph of the electrolyzed copper foil slice of experimental example 3 after high-temperature annealing.
Figure 3C:
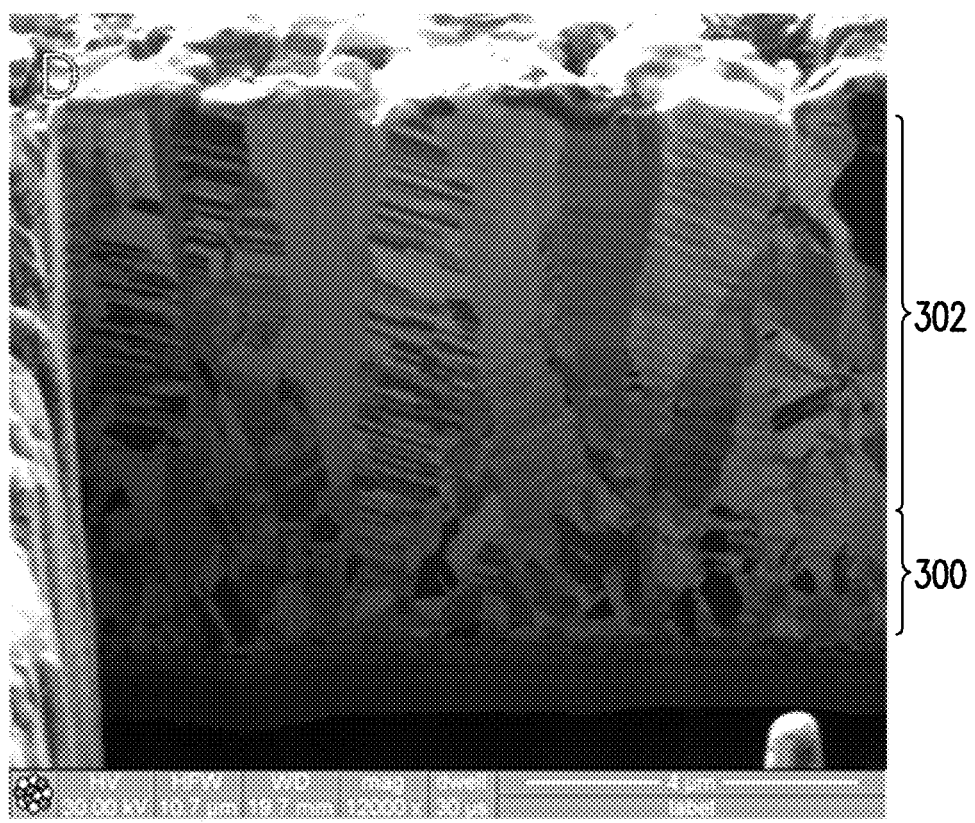
FIG. 3C is a FIB micrograph of the electrolyzed copper foil slice of experimental example 5.

Further, the electrolyzed copper foils of Experimental examples 3 and 5 were subjected to microstructure analysis by FIB (focused ion beam)-SIM (scanning ion microscope) to obtain FIB microscopic images of FIG. 3A and FIG. 3C, wherein a transition layer 300 and a nano-twin copper layer 302 formed on the transition layer 300 are shown. Then, the electrolyzed copper foil of experimental example 3 was heat-treated at 350° C. for one hour under a protective atmosphere, and microstructure analysis was also performed after cooling to obtain the FIB micrograph of FIG. 3B. It may be observed from FIG. 3A and FIG. 3B that the cross-sectional microstructure of the nano-twin copper layer 203 of the electrolyzed copper foil after high-temperature annealing is still substantially a structure including the columnar grain of the (111) plane.

In order to verify the structure of the transition layer, the same electrolysis process as in Experimental example 5 was used, but only an electrolyzed copper foil (i.e., a transition layer) having a thickness of 1.5 μm was formed, and X-ray diffraction (XRD) analysis was performed to calculate the volume ratio of the (111) plane to be 37.4%, the volume ratio of the (200) plane to be 30.9%, and the volume ratio of the (220) plane to be 31.7%.

In order to verify that the nano-twin copper layers of the electrolyzed copper foil structures of all experimental examples before and after high-temperature annealing had a structure substantially including the columnar grain of the (111) plane, the electrolyzed copper foils of Experimental examples 1 to 3 and 5 to 7 were respectively subjected to X-ray diffraction (XRD) analysis. Then, the sum of the heights (intensity values) of all the peaks representing the different crystal planes in the XRD analysis graph was the denominator, and the heights (intensity values) of the individual peaks representing the different crystal planes were the numerators, and the volume ratios of different crystal planes were calculated. The results are shown in Table 3 below.

Similarly, the electrolyzed copper foils of experimental examples 1 to 3 and 5 to 7 were annealed at a high temperature and cooled, and then subjected to XRD analysis, and the volume ratios of different crystal planes were calculated in the above manner. The results are also shown in Table 3 below.

TABLE 3

| | | Volume ratio of (111) plane | Volume ratio of (200) plane | Volume ratio of (220) plane |
|---|---|---|---|---|
| Experimental example 1 | Room temperature | 87.40% | 7.80% | 7.50% |
| | High-temperature annealing | 88.60% | 6.20% | 5.20% |
| Experimental example 2 | Room temperature | 90% | 5.50% | 4.50% |
| | High-temperature annealing | 91.10% | 4.60% | 4.30% |
| Experimental example 3 | Room temperature | 92.30% | 4.40% | 3.30% |
| | High-temperature annealing | 92.30% | 4.60% | 3.10% |
| Experimental example 5 | Room temperature | 85.2% | 7.7% | 7.0% |
| | High-temperature annealing | 84.3% | 7.4% | 8.3% |
| Experimental example 6 | Room temperature | 90.0% | 5.5% | 4.5% |
| | High-temperature annealing | 91.1% | 4.6% | 4.3% |
| Experimental example 7 | Room temperature | 92.3% | 4.4% | 3.3% |
| | High-temperature annealing | 92.3% | 4.6% | 3.1% |
| Comparative example | Room temperature | 48.6% | 38.4% | 13% |
| | High-temperature annealing | 29.6% | 49.6% | 20.8% |

It can be concluded from Table 3 that for all the electrolyzed copper foils annealed at 350° C. for one hour, the XRD analysis results thereof show that the volume ratios of the columnar grain of the (111) plane were all higher than 85%, and compared with the columnar grain of the (111) plane before annealing, the change amount in volume ratio thereof was less than 5%.

Based on the above, the electrolyzed copper foil of the disclosure is manufactured under specific electrolytic conditions, and thus has all of the characteristics of resistance to high temperature, not readily softened and cracked, and high conductivity. The electrolyzed copper foil manufactured by the disclosure is suitable for the current collector of an energy storage device due to the property of resistance to high-temperature softening thereof.

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An electrolyzed copper foil, comprising:
   a transition layer, wherein the transition layer has an equiaxial grain of a (111) plane having a volume ratio of 20-40%, a (200) plane having a volume ratio of 20-40%, and a (220) plane having a volume ratio of 20-40%, and a thickness of the transition layer is 0.2 µm to 1.5 µm; and
   a nano-twin copper layer formed on the transition layer, wherein the nano-twin copper layer has a columnar grain of the (111) plane having a volume ratio of more than 85%, and a thickness of the nano-twin copper layer is 3 µm to 30 µm.

2. The electrolyzed copper foil of claim 1, wherein the electrolyzed copper foil has a tensile strength greater than 50 kg/mm$^2$ at room temperature.

3. The electrolyzed copper foil of claim 1, wherein the electrolyzed copper foil has a tensile strength greater than 32 kg/mm$^2$ at 0.5% elongation.

4. The electrolyzed copper foil of claim 1, wherein the electrolyzed copper foil has a yield strength greater than 40 kg/mm$^2$ at 0.5% elongation.

5. The electrolyzed copper foil of claim 1, wherein the electrolytic copper foil has a tensile strength reduction of no more than 20% after a heat treatment at 350° C. for one hour.

6. The electrolyzed copper foil of claim 1, wherein after the electrolyzed copper foil is subjected to a heat treatment at 350° C. for one hour, a change amount in a volume ratio of the (111) plane in the nano-twin copper layer is less than 5%.

7. The electrolyzed copper foil of claim 1, wherein the columnar grain is consisted of a plurality of plate-shaped structures stacked perpendicular to grain boundaries of the columnar grain, and a length ratio of a major axis to a minor axis of each of the plate-shaped structures is 2 to 40.

8. The electrolyzed copper foil of claim 1, wherein the electrolyzed copper foil has a surface roughness Rz (JIS) less than 2 µm.

9. The electrolyzed copper foil of claim 1, wherein the electrolyzed copper foil has a conductivity higher than 90% IACS.

10. A current collector of an energy storage device comprising the electrolyzed copper foil of claim 1.

* * * * *